(No Model.) 3 Sheets—Sheet 1.
J. A. CASSIDY & W. A. BUTLER.
CONDUIT ELECTRIC RAILWAY.
No. 515,572. Patented Feb. 27, 1894.
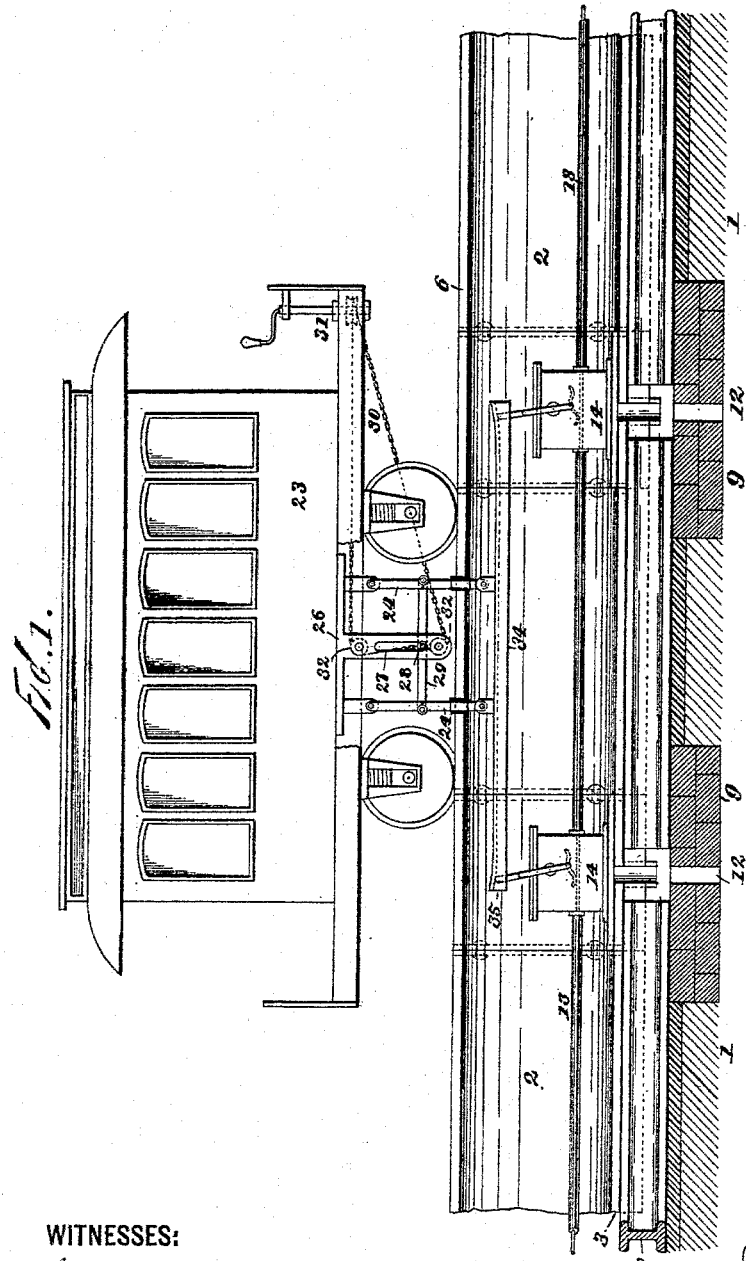
WITNESSES:
John Buckler,
Robt. F. Gaylord
INVENTORS
Joseph A. Cassidy
William A. Butler
BY
Duncan & Page
ATTORNEYS.

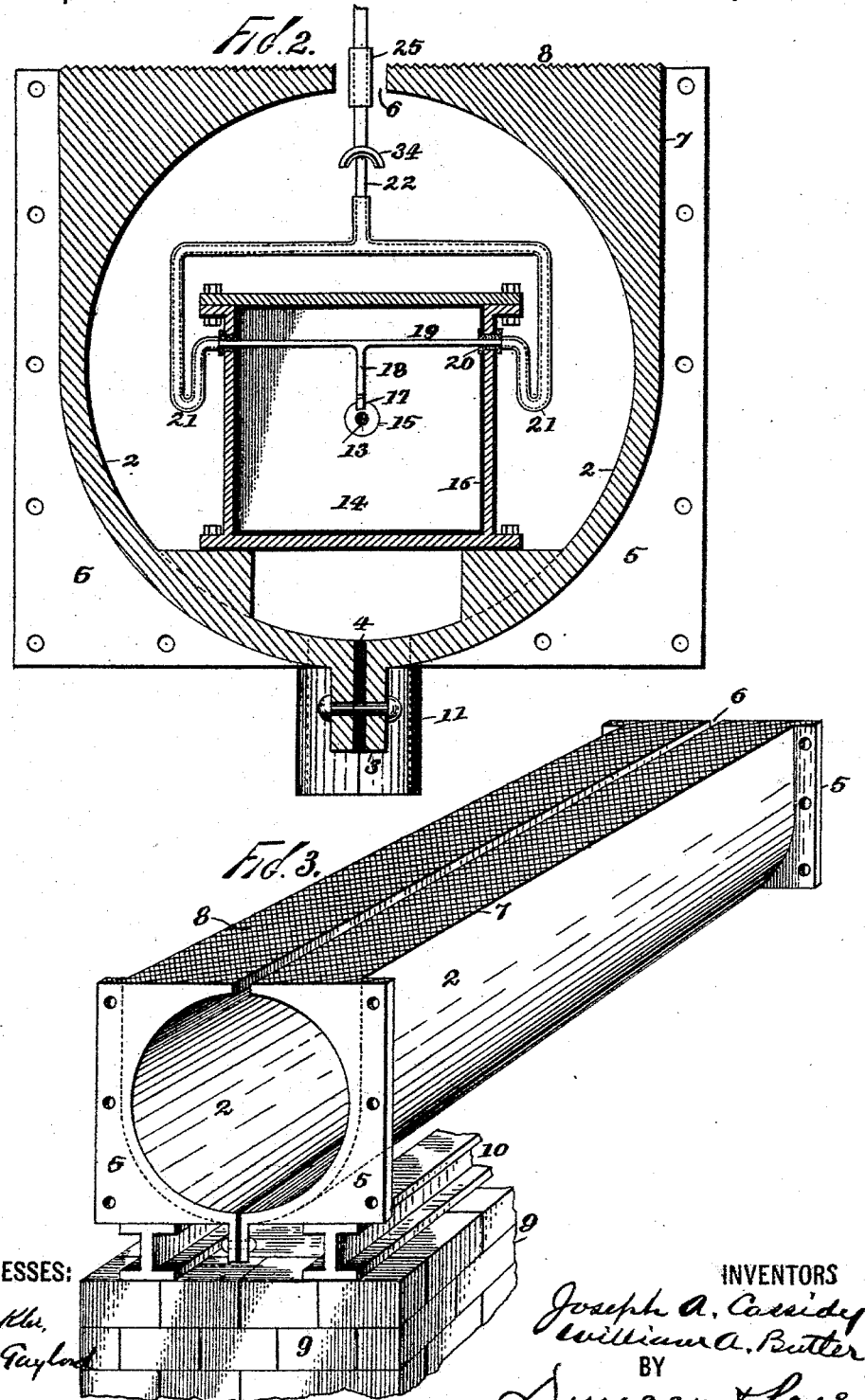

(No Model.) 3 Sheets—Sheet 3.
J. A. CASSIDY & W. A. BUTLER.
CONDUIT ELECTRIC RAILWAY.
No. 515,572. Patented Feb. 27, 1894.
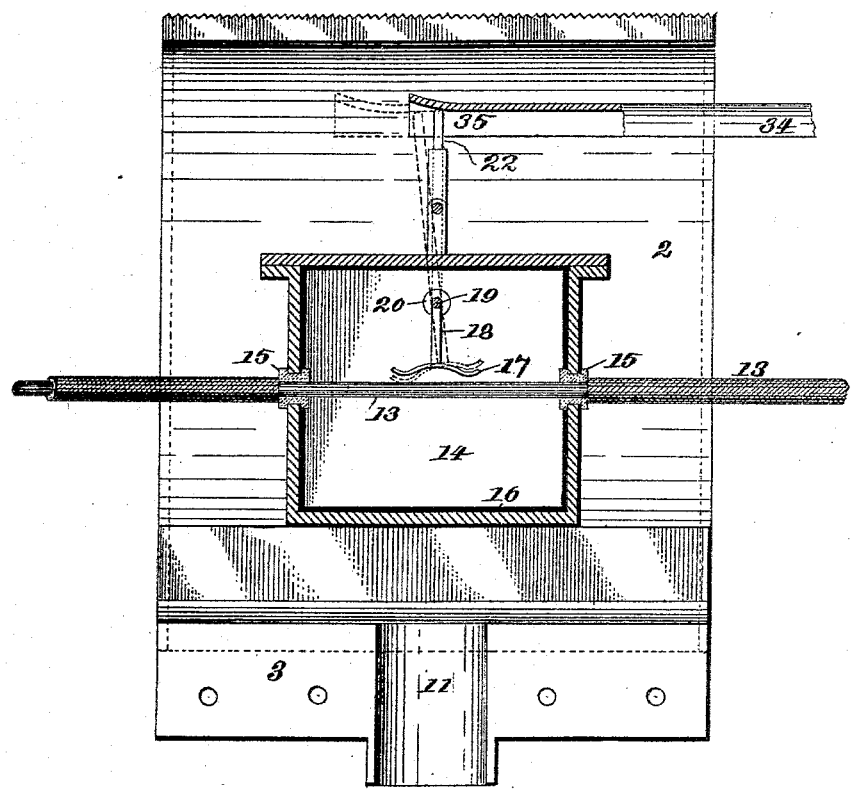
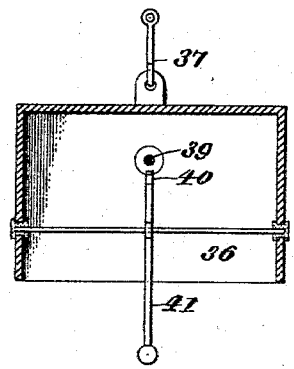
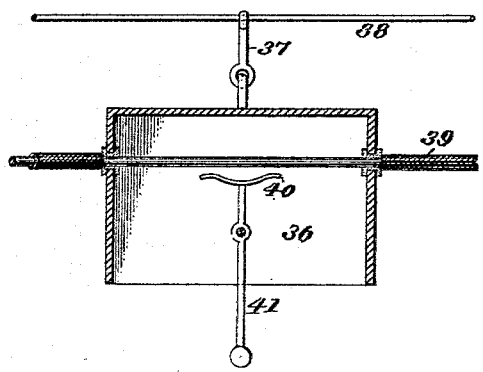
WITNESSES:
INVENTORS
Joseph A. Cassidy
William A. Butler
BY
Duncan & Pye
ATTORNEYS.
THE NATIONAL LITHOGRAPHING COMPANY,
WASHINGTON, D. C.

UNITED STATES PATENT OFFICE.

JOSEPH A. CASSIDY AND WILLIAM A. BUTLER, OF NEW YORK, N. Y.

CONDUIT ELECTRIC RAILWAY.

SPECIFICATION forming part of Letters Patent No. 515,572, dated February 27, 1894.

Application filed August 24, 1892. Serial No. 443,945. (No model.)

*To all whom it may concern:*

Be it known that we, JOSEPH A. CASSIDY and WILLIAM A. BUTLER, both citizens of the United States, and residents of New York, in the county and State of New York, have invented certain new and useful Improvements in Mechanism for Electrically Propelling Surface Cars, of which the following is a specification, reference being had to the drawings accompanying and forming a part of the same.

The present improvements relate to means for the electrical propulsion of surface cars of various kinds. The invention and improvements relate especially to means whereby the cars are propelled by power derived from an overhead or underground electrical conductor, which is provided at close intervals with vertically swinging or pendulum lever-contact devices adapted by the passage of a car to automatically effect electrical contact with the conductor and transmit the current, or a portion of the same, on the conductor to the electrical devices on the car, and so to the electric motor driving the same. Preferably, the electric conductor is located under ground, and the accompanying drawings in the main so illustrate the application of the invention; but we have also shown modifications illustrating how the invention can be embodied in apparatus requiring that the electric conductor be located above the car track.

The various features of invention and improvement will first be described in detail, and in the following claims the features believed to be new and novel will be set forth.

Figure 1 of the accompanying drawings represents a longitudinal vertical section of a roadway, and an electric conduit, together with a car and mechanism connecting the same with an electric conductor located in the conduit, the same embodying one form of our improvements. Fig. 2 is an enlarged cross-section of the conduit. Fig. 3 is a perspective view of one of the longer sections of the conduit. Fig. 4 is a longitudinal section of the same to a scale the same as that of Fig. 2. Figs. 5 and 6 are cross and longitudinal sections of boxes for supporting an overhead conductor, the same embodying modified applications of our invention.

Referring to the views in detail, the numeral 1 represents the groundwork of the electric wire conduit.

2 is one of the longitudinal halves of the conduit. This conduit is to be constructed of metal and made to the form of interchangeable cylindrical sections, each of which is composed of two longitudinal halves 2, which are provided with a strong base flange 3 running the length of the bottom of the parts of the section and by which the halves are firmly bolted together as shown, a lead or other suitable packing 4 being preferably placed between the flanges of a section to insure a water-tight joint. Each such half of these sections also is provided with end flanges 5 which project laterally from the body of the section and serve to secure one section to another. The halves of these sections are cast so as to not quite complete a circle at the tops thereof, whereby a slot 6 is formed, along which moves the electric contact parts hanging from the car and which project to within the conduit. The tops of these halves are also constructed to have the shoulders 7 and thickened flat treads 8, which treads are designed to be flush with the street surface.

We have not shown the rails of a car track, but it will be readily understood that this conduit may be located midway between the tracks or to one side thereof. Beneath the sections of the conduit, the groundwork preferably consists of masonry piers 9, which piers are located at each end of a section. Angle rails 10 lie upon these piers and extend from pier to pier, and upon these rails lie the conduit sections, especially as seen in Fig. 3.

The conduit is made up of long sections (Fig. 3) alternating with short sections (Fig. 4), each of which short sections is preferably located to rest on one of the masonry piers and between two of the long sections, as seen in Fig. 1. At the longitudinal center of the base of each of these short sections of conduit, is located a drain pipe connection 11, which communicates with a branch pipe or passage 12 in the pier masonry leading to the sewer of the street or other suitable drainage passage. These long and short sections are joined together end to end to form a continuous conduit located below the street level.

The parts of each of the two kinds of sections are made to a common size and so are interchangeable. The end flanges of the sections serve as lateral braces to prevent the conduit expanding and thus opening the slot along the top of the same. Furthermore, the upper horizontal tread portions 7 and 8 projecting laterally as they do with increasing thickness from the slot edges, serve also to give to the top of the conduit all requisite stiffness and strength whereby to resist heavy traffic.

13 indicates the electric conductor, which is preferably located nearly central to the conduit, so as to be well above any water or damp collection that may be in the conduit. This conductor is supported at short intervals by boxes 14, which boxes we term contact boxes, since it is within these boxes that contacts with the conductor are effected to derive current for the operation of a passing car. The conductor passes lengthwise through these boxes, entering and passing out through insulating blocks 15 supported in the walls of the boxes. Between the boxes and up to these blocks 15 the conductor is heavily and completely insulated; but between, or for a part of the way between the insulating blocks of any one contact box, the conductor is bared see particularly Fig. 4. These contact boxes are suitably supported one within each of the short sections of the conduit. They are made of any suitable material, and may be interiorly lined with insulating material 16, and they are closed air and water-tight by covers.

17 is a double contact strip or arm, adapted to rock either forward or backward and thereby come in contact with the bared portion of the conductor. This contact arm is preferably constructed of elastic metal so that it may have sufficient spring to permit it to hold to contact through any range of movement necessary to compensate for the looseness or other variation in the size or motion of its operating parts. This contact arm is centrally fixed to the lower end of the rocking bar 18 which depends from the rocking rod 19 journaled in the insulating blocks 20 supported in the walls of the contact box 14. Outside the box this rod 19 depends to form the balance loops or arms 21, and then bends upwardly and passes across the top of the box where its two ends join the rocking lever 22. This lever and the arm 18 being integral, they constitute a rocking contact lever, to which the loops 21 serve as balance weights, so that in normal position this contact lever hangs pendulum-wise and the contact strip 17 is held away from the electric conductor. Outside the contact box, this contact lever is fully insulated, except at its upper end 22.

23 indicates a car. 24 indicates toggle arms hanging therefrom and through the slot 6 of the conduit, these arms being provided with insulating pieces 25 to prevent their having electrical contact with the conduit. 26 is a guide post depending from the car, which post is slotted at 27 and receives the friction roll 28 at the junction of the toggle levers 29. A chain 30, extending to and from the car operator's crank handle 31, is attached to the joint of the levers 29 and passing over pulleys 32 suitably placed, serves to raise or lower the central joint of the toggle levers, and so elevates or depresses the lower ends of the toggles 24, and the devices attached thereto.

34 is what we term a contact bar. It is pivotally hung to the lower ends of the toggle arms 24, and has motion vertically to and from the contact levers 22 hung in the contact boxes 14. When at its lowermost position, Fig. 1, this bar is designed to hit the tops of the contact levers and swing them over so as to effect electrical contact of the contact strips with the bared portion of the electric conductor. This bar is grooved along its under surface or increased downward, as seen in Fig. 2, or is in the form of an inverted trough. Thus, when it strikes and engages one of the contact levers, this bar partially incloses the top of the lever and holds the same deflected during its passage. The end 35 of the contact bar is flared so that its engagement with the contact levers will be insured and without shock or a too suddenly deflecting blow. The length of the contact bar is such as practically corresponds to or is a little more than the distance between the contact levers in the conduit. Thus, a forward lever will be engaged before the bar leaves or frees a previously engaged lever, see Fig. 1. By these means, it will be seen that the current or a portion thereof can be taken from the electric conductor; up through the contact strips and levers, through the contact bar and through the toggle devices supporting this bar, from which latter it could be conveyed to any suitable motor on the car.

In cases where an overhead conductor is employed, and the contact bar, or similar device is elevated from the top of the car, we employ contact boxes as seen in Figs. 5 and 6. The view in Fig. 5 being a horizontal and that of Fig. 6 being a cross-section of the same. Here 36 represents such a box, which is closed only at its top, sides and ends, its lower or bottom part being left open. 37 is a suspension connection whereby the box is hung from a wire, rod or other suitable support 38. 39 is the electric conductor, which enters and traverses the box as in the case before described. 40 is the contact strip, and 41 the contact lever, which hangs pendulously and in normal position is as shown with electrical contact broken. The passage of a contact bar carried on a car will deflect the contact levers as before and effect the derivation of the current necessary to propel the car.

We are aware that various forms of electric devices and mechanisms of the general type herein shown and described have been proposed, and we do not therefore broadly claim the same, but, specifically or particularly,

What we claim as new is—

1. In combination with a car, an electric contact bar 34 adapted to operate contact levers arranged within a conduit and to thereby electrically communicate with an electric conductor, toggle mechanism 24, 29, connecting said bar to said car, and means substantially as described for operating said toggle mechanism.

2. In combination with a car, an electric contact bar 34, pendulum contact levers 22 arranged within a conduit and mounted in protective boxes 14, and toggle mechanism, 24, 29, connecting said bar to said car and for elevating and lowering said bar, substantially as set forth.

3. In combination, in an underground conduit structure, the short conduit sections (Fig. 4) and the long conduit sections (Fig. 3) the said sections being composed of the halves 2 provided with the flanges 3 and 5, whereby the separate parts and sections of the conduit are joined together, the said short sections being provided with electric contact boxes having mounted therein pendulum contact levers and being also provided with the drain pipe connection 11, and an electrical conductor extending between such contact boxes, substantially as and for the purpose set forth.

4. In combination, an underground conduit structure composed of the short conduit sections (Fig. 4) and the long conduit sections (Fig. 3) the said sections being made up of the halves 2 provided with the flanges 3 and 5 whereby the separate parts and the sections are joined together, electric contact boxes mounted in said short sections and provided with an electric conductor and pendulum contact levers, and a contact bar 34 of length corresponding to the space between said contact boxes, and mechanism substantially as described connecting the said bar to a surface car and adapted to raise and lower the same, substantially as and for the purpose set forth.

JOSEPH A. CASSIDY.
WILLIAM A. BUTLER.

Witnesses:
A. J. BUTLER,
M. F. CASSIDY.